(12) United States Patent
Jaeger

(10) Patent No.: US 6,345,028 B1
(45) Date of Patent: Feb. 5, 2002

(54) METHOD FOR DIRECT RECORDING AND PLAYBACK OF MULTIPLE DATA TRACKS AND SIGNALS

(75) Inventor: Denny Jaeger, Oakland, CA (US)

(73) Assignee: Intertactile Technologies Corporation, Oakland, CA (US)

( * ) Notice: Subject to any disclaimer, the term of this patent is extended or adjusted under 35 U.S.C. 154(b) by 0 days.

(21) Appl. No.: 09/294,456

(22) Filed: Apr. 19, 1999

Related U.S. Application Data

(63) Continuation-in-part of application No. 08/963,108, filed on Nov. 3, 1997, now abandoned.

(51) Int. Cl.[7] .................................................. G11B 3/64
(52) U.S. Cl. .................. 369/84; 369/59.26; 369/53.34; 369/124.08
(58) Field of Search .............................. 369/84, 83, 48, 369/49, 47; 386/4, 52, 54, 55, 59, 124, 59.25, 59.26, 124.07, 124.08, 53.34, 47.16

(56) References Cited

U.S. PATENT DOCUMENTS

| | | | |
|---|---|---|---|
| 4,320,486 A | * 3/1982 | Cooley et al. ................ | 369/61 |
| 4,823,333 A | 4/1989 | Satoh et al. .................. | 369/84 |
| 5,289,190 A | * 2/1994 | Shimoda et al. .............. | 369/84 |
| 5,295,126 A | 3/1994 | Okano et al. ................. | 369/47 |
| 5,311,491 A | 5/1994 | Tabuchi et al. ............... | 369/47 |
| 5,331,617 A | 7/1994 | Fuma et al. .................. | 369/84 |
| 5,402,406 A | 3/1995 | Fuma et al. .................. | 369/84 |
| 5,414,688 A | 5/1995 | Inokuchi ...................... | 369/84 |
| 5,428,598 A | 6/1995 | Veddhuis et al. ............. | 369/84 |
| 5,625,610 A | 4/1997 | Hiranuma .................... | 369/47 |

\* cited by examiner

*Primary Examiner*—Thang V. Tran
(74) *Attorney, Agent, or Firm*—Harris Zimmerman, Esq.

(57) ABSTRACT

A process for recording and playing audio, video and/or data signals simultaneously from a recording medium includes the steps of initially acquiring a plurality of audio, video and/or data signals. Incremental temporal segments of each signal are taken and assembled into a single composite data frame in memory, and the composite frame is recorded in a permanent or erasable recording system. For example, the first 100 ms of each signal comprises the first incremental temporal segments, and all of these first segments of all signals are recorded in a predetermined order in the first composite frame. The second composite frame consists of the second 100 ms segments of the same signals, which are recorded in the same order as the first composite frame. This process is reiterated until the entire lengths of all of the signals are recorded in such composite frames. Alternatively, each composite frame may be subdivided in sub-sections, each sub-section comprised of time-slices of the segments of the signals held in memory. If the frames are recorded on a data disk, they are placed in contiguous order, to the greatest extent possible, to minimize the seek time of the disk drive read/write heads. For playback, the composite frames are read from the recording system as a data stream that is loaded into memory, where each frame is read out, disassembled, and defined as separate signals corresponding to the plurality of signals that were initially recorded.

60 Claims, 6 Drawing Sheets

METHOD FOR DIRECT RECORDING AND PLAYBACK OF MULTIPLE DATA TRACKS AND SIGNALS

REFERENCE TO RELATED APPLICATION

This application is a continuation-in-part of U.S. patent application Ser. No. 08/963,108, filed Nov. 3, 1997 abandoned.

BACKGROUND OF THE INVENTION

The present invention relates in general to recording and playback of data tracks and digital signals in general, and in one aspect, to recording and playback on disk drives and the like. In another aspect it relates to maximizing the number of audio or video tracks that can be played back from a disk drive.

The disk drive that is ubiquitous in computer data and application storage is also useful in storing audio information for mixing, production and performance of music. Audio tracks from instruments, voice input, and sampled sounds may be digitized and stored on a disk in the same manner that other data is stored. Disk drives are typically formatted to contain a large plurality of concentric digital data tracks which are each divided into multiple sectors, the sectors and data tracks being assigned unique address locations. A computer records data, and retrieves the data by moving one or more read/write heads to address locations corresponding to the data sought. Disk operating systems often record data on an available track sector that is closest to the read/write heads. Moreover, a data may be split up and recorded on many sectors of different digital tracks, in accordance with track availability and proximity to the read/write heads, disk operating system programming, and the like.

When it is desired to play back the audio information, the disk drive read/write head(s) seeks the address locations of the information on the disk drive, reads the digitized audio information from the addressed sectors and digital tracks, and sends it to RAM. In the frequent instances wherein multiple audio tracks must be played simultaneously for polyphonic composition and the like, all of the tracks generally must be loaded into a RAM buffer before playback can proceed. Clearly the seek time of the playback head(s) comprises a significant temporal limitation for the playback system. In addition, the size of the RAM buffer generally comprises an operational limit to the number of tracks that are read into memory before playback proceeds.

As a general rule, 12 Mb of RAM can buffer 64 simultaneous record or playback tracks from a single very fast disk drive. Increasing the amount of RAM does not significantly increase the number of audio tracks that can be played simultaneously, unless the full length of each entire audio track is fully loaded into RAM. This approach can require an enormous amount of RAM, and is not practical due to the large expense involved. For example, a 4 gigabyte hard disk drive can be purchased for as little as $300, which is approximately the same cost as 64 Mb of RAM (at current prices). However, four gigabytes of RAM would cost $3000, or more than 10 times the cost of hard disk storage capacity.

Furthermore, the number of tracks that can be played back from a single disk rive is also determined by the sample rate and the bit structure of the data being recorded on the disk. As the sample rate increases, i.e., from 48 Khz to 96 Khz to 192 Khz, the space required on a hard disk, magnetic tape, or optical media is doubled each time. This factor slows down the acquisition of this data by conventional means. The same increase in disk space occurs if the bit structure of the data increases, i.e., from 8 bit to 16 bit to 32 bit words.

SUMMARY OF THE PRESENT INVENTION

The present invention generally comprises a process for arranging a plurality of signals, including data tracks, audio tracks, or video tracks in composite data frames, each data frame containing a temporal segment of each data track, audio or video track. The composite data frames may be recorded to any recording medium, such as magnetic disk drives, optical disks, DVD, CD-ROM, WORM drives, RAM, FLASH memory, any memory that permits random access, any memory that permits random access and is rewritable and/or usable as the main memory of a processor, ROM and magnetic tape, or the like.

For the purposes of this invention the following memory can be used: random access memory (RAM)—SRAM, DRAM, etc., FLASH memory and any memory that permits random access and any memory that permits random access and is rewritable and/or usable as the main memory of a processor. In all descriptions herein, all references to "RAM" shall include any of the types of memory just described. In addition to the types of memory described above, a read only memory (ROM) can also be used for storing assembled composite data frames. In the case of ROMs the memory contents are the composite data frames, and these frames would be one time configured in the ROMs.

In one embodiment, the invention relates to recording and playing back audio, video, or data tracks simultaneously from a disk drive, whereby the number of audio tracks that can be played simultaneously directly from the disk drive is increased far beyond the capability of state of the art devices. For purposes of this discussion a "disk drive" or "data drive" refers to any type of disk drive capable of playing back audio or video or any data. This includes all hard disk drives, optical drives (both WORM and erasable), removable disk drives, compact disk (CD), digital video disk (DVD), other read only optical drives, floppy drives and the like. Hereinafter, any reference to audio tracks, data tracks or video tracks will be presumed to include any and all audio signals, data signals, or video signals, whether or not they are specifically configured as tracks, and any reference to one is intended to encompass all.

Initially, a plurality of audio tracks are recorded on a disk drive, using technology known in the prior art, the audio tracks being recorded in digitized format in available portions of the disk drive. Thereafter, in order to maximize the number of audio tracks that can be played back simultaneously, the recorded audio data is re-ordered, as follows. Incremental temporal segments of each recorded audio track are read from the disk and assembled into a composite data frame in RAM, and the frame is recorded back onto a disk drive. Thus, for example, the first 100 ms of each audio track comprises the first incremental temporal segments, and all of these segments are recorded in a defined order in the first composite data frame. The second frame consists of the second 100 ms segments of the same audio tracks, which are recorded in the same order as in the first frame. This process is reiterated until the entire lengths of all of the audio tracks are re-ordered and recorded in such frames on the disk drive. Reiteration may be carried out R times, where R may vary from zero to any positive integer. The frames are placed on the disk in contiguous order, to the greatest extent possible, to minimize the seek time of the disk drive read/write heads. But because of physical writing limitations of disk drive architectures and/or requirements of disk drive operating systems, these frames may not always be capable of being written in contiguous order. Within the constraints of any given operating system, the disk can be partitioned to improve the probability of contiguous allocation of space for composite data frames.

In an alternative embodiment of the invention, each composite data frame is constructed of sub-sections, each sub-section comprising portions of the audio tracks that are held in RAM. After the audio tracks are recorded in original format on a disk drive, incremental temporal segments of each recorded audio track are read from the disk and stored in RAM, as in the previous embodiment. However, in the alternative embodiment, a plurality of sub-sections are formed from the RAM data, all of the sub-sections comprising one composite data frame. Each sub-section is comprised of incremental time slices of all of the audio tracks, arranged in a predetermined order. For example, given that 100 ms segments of all tracks are stored in RAM, each sub-section may comprise 10 ms incremental time slices of all tracks, and 10 sub-sections are required to construct one composite data frame that fully represents all of the audio track data stored in RAM. Thereafter, the sub-sections are recorded on a disk drive in substantially contiguous order. The number of sub-sections is equal to any chosen integer, and the incremental time slice period is set to be a fraction equal to initial segment length X divided by the chosen integer N.

Each frame is labeled with a time stamp that encodes the ordered position of the frame among all the composite data frames. The time stamp distinguishes the location of the starting point of each frame or sub-section on the disk drive data tracks. In addition, a registry of all the start times is created and stored in memory, as well as on backup storage media. The disk drive operating program is capable of reading the start time registry and directing the read/write head to the start of any frame, and also to read out the frames in an ordered manner. The disk drive reads each composite frame as a data stream that is loaded into RAM, where it is read out, disassembled, and routed to separate outputs as the plurality of audio tracks that were initially recorded. Initially, the first two frames are loaded into RAM. After the first frame is read out as audio tracks, it is erased while or after the third frame is loaded into RAM, and so on. In this manner the individual audio tracks are reassembled from the track segments that comprise each frame, and playback of all the audio tracks appears to be continuous and simultaneous. However, the amount of RAM required for this process is only a small fraction of the RAM required to read out and store all of the audio tracks in complete form prior to playback, as is required in prior art devices.

The disk drive may be partitioned with differing partitions used to record the composite data frames to protect the composite data frames from being erased during the recording process and to increase the probability of keeping the composite data frames contiguous. In addition, partitioning may be used to protect the original audio data tracks from being overwritten by the composite data frames. Alternatively, the original audio tracks or signals may be sacrificed and overwritten if it is determined that they are no longer required or if they have been backed up on another storage medium. In a further alternative, the composite date frames may be recorded on a disk or disk sector in contiguous relationship as one file, whereby the data frames may be read out consecutively as a single continuous data stream. Such a file would be the equivalent of creating multiple individual composite data frames and storing them on a data source, like a disk drive, DVD, CD, etc. and reading them all as a single file.

In a further embodiment, a plurality of signals (audio tracks, video tracks or data tracks) from any source are acquired from any source, such as, but not limited to, data disk, magnetic tape, any optical media, a computer bus or other data bus, internet data stream, live recording, or the like. As the signals are received, incremental temporal segments of each signal are assembled into composite data frames in a memory, and the composite data frames are recorded by any data recording system or onto any recording medium, such as any magnetic or optical medium, any tape medium or any memory.

As described previously, the composite data frames may also be comprised of sub-sections. The sub-sections and the composite data frames may be recorded in substantially contiguous order, or may be recorded in any desired order, or in a changeable order. To effect playback of the signals, each composite frame is read from the recording system or medium, loaded into a memory, disassembled, and each temporal segment of each track is routed to a respective output. This process is reiterated, so that playback of all the audio or data tracks appears to be continuous and simultaneous. One advantage of this latter embodiment is that from the instant that playback is initiated, all of the tracks stream from the recording device and are available to be played, processed, modified, and/or re-recorded. Another advantage of this embodiment is that it is capable of dealing with tracks (signals) of differing sampling rates and word size (bit structure). For example, incoming signals may include audio, video, and control tracks, all having differing sampling rates and word structure. Inasmuch as each temporal segment of each signal is captured "as is", the signal structure and data rate are preserved when the segments are reassembled for playback. And, playback speed is not noticeably delayed by the seek time of the recording medium, nor limited by the bit structure or sample rate of any audio, video, or data signals.

In another embodiment, a plurality of audio, video, or data signals from any sources are processed as follows: incremental temporal segments of the signals are ordered as composite data frames (as defined previously) as they are read from RAM or other memory media. The composite data frames are then recorded on a data disk, magnetic tape, optical disk, or any other type of recording media. Thus when the signals are previously existing in RAM or the like, it is not necessary to employ a RAM buffer to create the composite data frames for recording purposes. The data can be read as composite data frames directly from the memory and then recorded on whatever medium is desired using any method previously described.

DESCRIPTION OF THE PREFERRED EMBODIMENT

In one aspect, the present invention generally comprises a process for simultaneously playing back a large number of audio or data tracks that are arranged in composite data frames and stored on any applicable recording medium, including but not limited to magnetic or optical media, such as hard disk drive, floppy or removable disk drive, CD-ROM, DVD, WORM drive, erasable optical disk, translating media such as magnetic tape, RAM, ROM, or any other suitable memory. Although the first embodiment will be described with reference to the use of a disk drive, the invention is not limited by the source of the audio or data tracks, nor the recording medium. Hereinafter, any reference to audio tracks, data tracks or video tracks will be presumed to include any and all audio signals, data signals, or video signals, or any combination thereof, whether or not specifically configured as tracks, and any reference to one is intended to encompass all.

Figure 1:
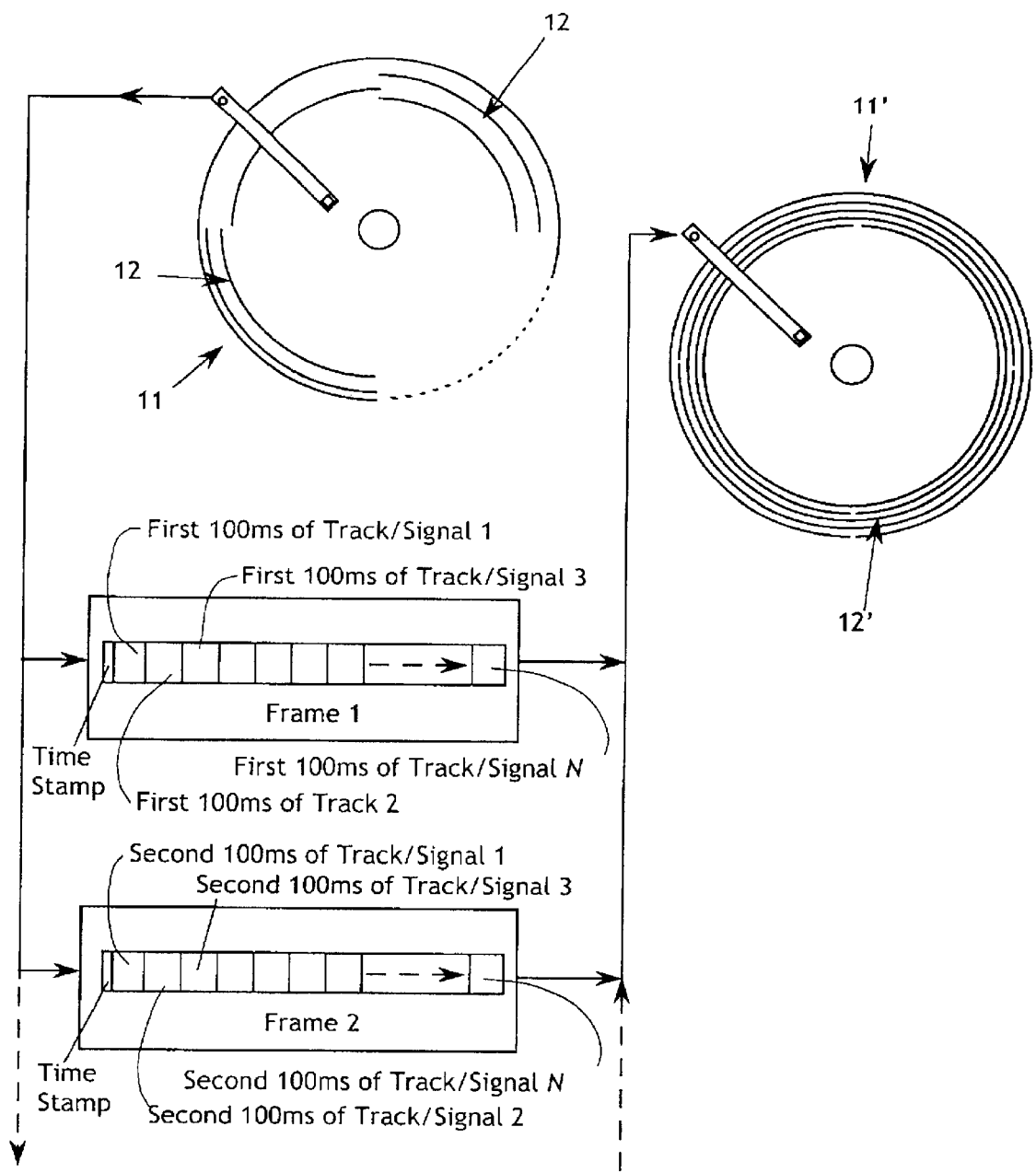
FIG. 1 is a schematic representation of the process of the invention for re-organizing a large plurality of audio/video/data tracks or signals on a disk drive for playback.

With regard to FIG. 1, a disk drive 11 is used initially to record a large plurality of audio tracks/signals, using devices known in the prior art to digitize the audio tracks and record the digitized data on the drive 11. Typically, each audio track/signal is recorded on one or more sectors of predefined disk tracks 12. The recording process generally proceeds by available empty sectors on the disk tracks being recorded on a first-available basis, whereby the audio tracks/signals may be placed on the disk 11 in a disordered manner. This lack of contiguity of the recorded tracks/signals can limit the disk's ability to read out and play back a large plurality of tracks/signals simultaneously.

For the purposes of the following example, the simultaneous play back of 64 audio tracks or more is illustrated, although the composite data frame method of recording is able to play back far more audio tracks simultaneously from a single disk drive.

To overcome this drawback in the playback process, the invention processes the recorded audio tracks by re-ordering the audio data and recording new composite data frames onto a disk drive. First, incremental temporal segments of each recorded audio track are read from the disk 11 in a predetermined numerical order, e.g., starting with track 1 and ending with the last recorded track (e.g., track N). The temporal segments are all of the same short duration, such as 100 ms, although other durations may be used. In the example of FIG. 1, the first 100 ms segments of tracks 1–N are read in a predetermined order from the disk 11 and placed in a RAM buffer in the predetermined order, where they are assembled into composite data frame 1. Frame 1 is labeled with a time stamp which indicates the starting point of the frame and also the number of the frame. Likewise, the second 100 ms segments of tracks 1–N are then read from the disk drive 11 and placed in the RAM buffer as data frame 2, which is also labeled with its respective time stamp. This process is reiterated until the entire lengths of all of the audio tracks or signals are re-ordered into the composite data frame mode. Reiteration may be carried out R times, where R may vary from zero to any positive integer.

Thereafter, or simultaneously, the composite data frames are recorded onto a disk drive, indicated as reference numeral 11', which may be any disk drive or equivalent recording media. In either case, the frames are placed onto the disk 11' in as contiguous order as practically possible on disk tracks 12', as indicated in FIG. 1. The frames are recorded as contiguously as possible to minimize the seek time of the read/write head of the disk drive during read out, as described later. The composite data frame recording may take place on the disk 11 without necessitating removal of the original audio track recordings from the disk, assuming there is sufficient empty recording space on the disk 11 for the frame format. The disk 11 may be previously partitioned to define separate portions for recording the original audio sound tracks and for recording the composite data frames, whereby both the original tracks and the re-ordered composite data frames are protected from being overwritten. If disk 11 storage capacity is not sufficient for these purposes, the original audio tracks may be overwritten, or a secondary disk 11' may be used for recording the composite data frames.

At the same time, a registry of all the time stamps of all the frames is created and stored in RAM, and also on the disk 11 or 11', or other storage medium. The registry enables the disk drive operating program to direct the read/write head to the start of any frame, and also to read out the frames in a predetermined order.

Figure 3:
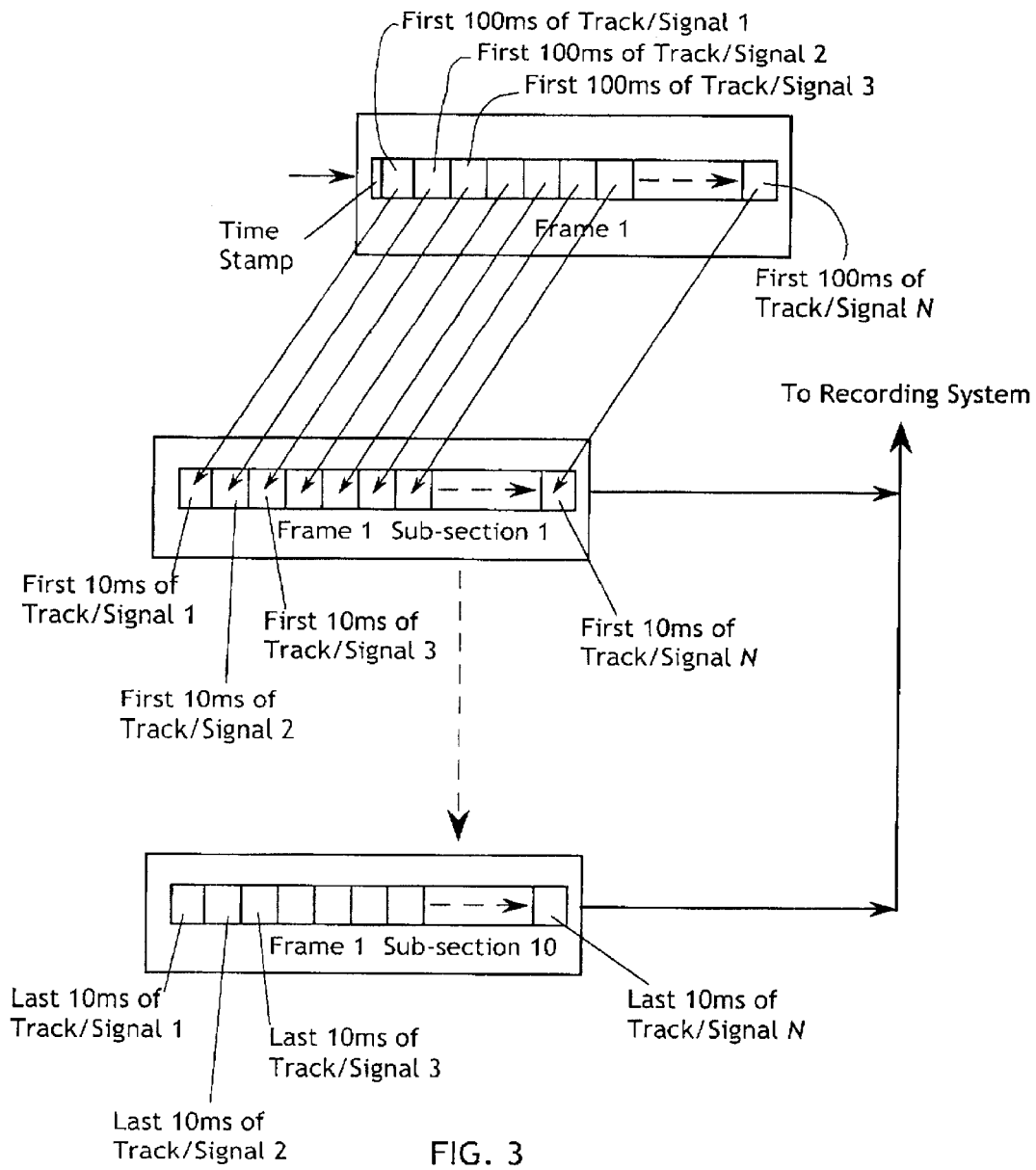
FIG. 3 is a schematic representation of an alternative embodiment of the process of the invention for re-organizing a large plurality of tracks/signals on a disk drive for playback.
Figure 4:
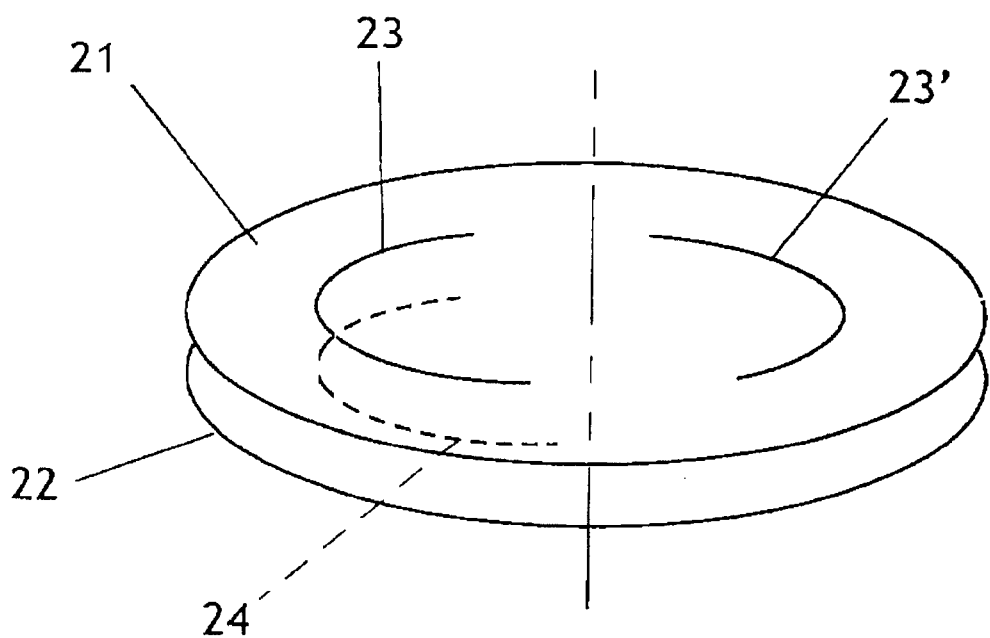
FIG. 4 is a schematic representation of a further embodiment of the invention in which the reorganized tracks/signals are recorded in non-contiguous parallel fashion.

Alternatively, the composite data frames may be ordered and recorded in parallel fashion on a disk drive. With regard to FIG. 4, a disk drive system may include a rotating recording surface 21, and may include parallel read/write heads that access the surface 21. In such systems, track sections 23 and 23', which may comprise diametrically opposed portions of one or a pair of disk tracks, may be written with respective composite frames in the predetermined order of the system, such as composite frame 1 on disk track 23 and composite frame 2 on disk track 23'. The writing process may occur simultaneously if multiple write heads are provided. Likewise, the disk system may include a further data recording surface 22 rotating in common with surface 21, such as the obverse side of surface 21 or a separate disk entirely. Disk track section 24 on surface 22 may be written with a composite data frame simultaneously with the writing of disk track section 23 or 23', whereby recording of the composite data frames are disposed for efficient retrieval. This technique may be used with equal effectiveness in the embodiment of FIGS. 1 and 2, or with the composite sub-sections of data frames described below with reference to FIG. 3.

Figure 2:
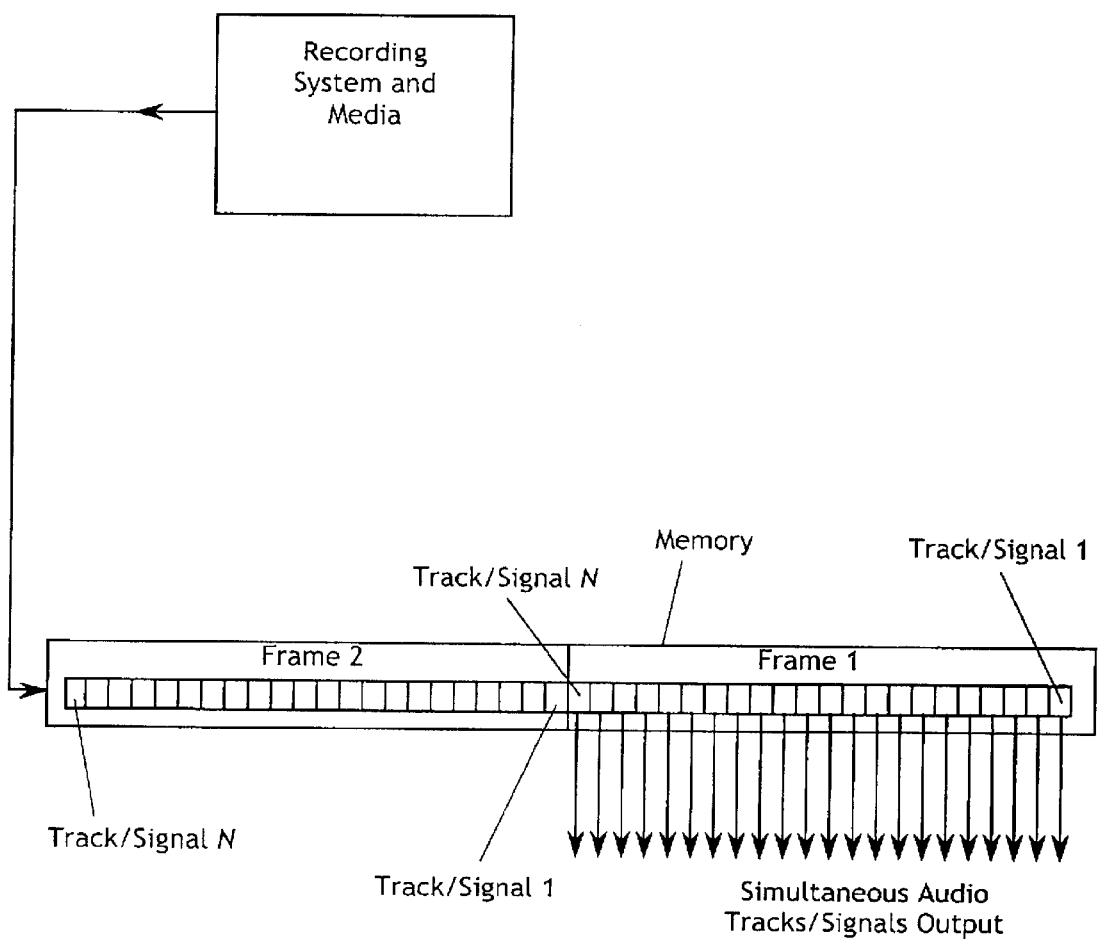
FIG. 2 is a schematic representation of the process of the invention for readout and simultaneous playback of the re-organized tracks/signals formed as shown in FIG. 1.

With regard to FIG. 2, when it is desired to play back the N audio tracks simultaneously, the disk drive is directed to the time stamp location of composite data frame 1, which is read into a memory buffer, followed by frame 2, and the like reiteration. The buffer may comprise the same RAM that is used to assemble the frames initially, as described previously. Each composite data frame loaded into the buffer is disassembled into its separate component segments, and each segment is defined as an individual audio/video/data track or signal which can be sent to a respective output. The segments contained in each composite data frame can be streamed to their respective outputs at a data rate sufficient to permit continuous, uninterrupted playback of each track or signal, whereby all the tracks/signals have the quality and continuity of multi-track, simultaneous playback. After a frame is disassembled and read out of the buffer, it is erased and replaced by the succeeding frame. The memory buffer may hold more than two frames, if necessary, to accomplish this task smoothly.

As an example for illustration only, a N track music recording may have a length of 30 seconds, and the length of each segment is set at 100 ms. These circumstances require 300 composite data frames to be constructed and recorded on the disk (30 seconds divided by 100 ms). The disk drive read/write head thus must undergo 300 seek routines to access and play back the 30 second music selection consisting of N audio tracks. The amount of memory buffering that would be needed in this case is generally twice the length of a single frame. This is calculated as twice the product of N audio tracks times 100 ms, which is 12.8 seconds for 64 audio tracks. Assuming an audio recording sampling rate of 50 KHz, and a general rule that 1 MB of RAM can store 10.46 seconds of monaural audio at this sample rate, the entire 30 second recording of all 64 tracks may be played back simultaneously in real time using two composite data frames in RAM at a time in 1.22 MB RAM. In contrast, prior art devices can require 12 MB RAM to buffer 64 audio tracks, and no more than 64 tracks can be buffered due to seek time limitations of the data disk read/write heads. Thus the invention provides a significant improvement in performance, in both the number of audio tracks provided simultaneously, and the far more efficient use of RAM.

It may be appreciated that the invention may be implemented as an audio record/playback apparatus, or it may be provided as a software application that upgrades the performance of an existing record/playback apparatus. It may also be used to permit the immediate recall of complex sampled sound patches for electronic keyboards. For example, each segment in a composite frame could be a 100 ms segment of each sample in a patch. A keyboard player could push a recall button and immediately hear the recorded patch without first having to load the whole patch into RAM. In this regard, the term "audio track" used herein is defined as any audio signal that is fixed or recorded in any medium where it is capable of being played back to recreate the original audio signal.

An alternative embodiment of the invention involves the steps of recording the original audio tracks on a disk drive 11, and reading out temporal incremental segments of each audio track in a predetermined order into a memory buffer, as described previously. As before, the temporal segments are all of the same duration, e.g., 100 ms. With regard to FIG. 3, each temporal segment may be further divided into equal sub-segments, and these segments may be assembled as a sub-section of a composite data frame. Each sub-segment comprises an incremental time slice of one audio/video/data track or signal, and each sub-section of the composite data frame comprises all of the incremental time slices for a given time period of all the tracks/signals, assembled in a predetermined order.

For example, if a composite data frame in RAM consists of 100 ms of each audio track of a 64 track recording, sub-sections may be formed by taking the first 10 ms of each audio track and assembling them in a desired order in frame 1, sub-section 1, and the second 10 ms of each audio track assembled in the same order in frame 1, sub-section 2, and so on. In this manner ten sub-sections may be formed to process the frame 1 contents of the RAM buffer. The sub-sections are then sent to a recording system of any suitable type, whether magnetic disk media, optical media, magnetic tape, or the like. If the sub-sections are written to the disk 11 or 11', it is carried out in a manner as contiguous as possible to minimize read/write head seek time. This alternative approach forms data portions of smaller size than the previous embodiment, and this factor is significant in maintaining maximum performance in audio readout. Indeed, the sub-segment duration may be as small as 1 ms, requiring 100 sub-sections to complete one composite data frame. Even smaller sub-segments of sub-millisecond length are possible. Considering the program interrupt functions that are embodied in most system software, the smaller data portions are more easily written and subsequently read out in the midst of system interrupts. In other words, the alternative method more easily streams a large amount of data from a single drive without losing any of the data's integrity.

As in the previous embodiment, each composite data frame is labeled with a time stamp, and a registry of all the start times is created and stored in memory. To read out the 64 audio tracks, the disk read/write head locates each composite data frame, and reads out the sub-sections of each composite data frame as a data stream into the RAM buffer. From the buffer, the sub-segments of the audio tracks are reassembled into track segments, and the track segments are directed to their respective audio track or channel. The sub-segments contained in each composite data frame are streamed to their respective audio outputs at a data rate sufficient to permit continuous, uninterrupted playback of each audio track, whereby all the audio tracks have the quality and continuity of multi-track, simultaneous playback.

The predetermined order for assembling incremental temporal segments and time-slice sub-segments may be defined as serial, or ordered in a non-serial manner. Alternatively, the order may be calculated and altered in accordance with a random number generator or with a scrambling (encryption) algorithm. The sub-segment ordering may be identical or may differ from the ordering of the segments in each composite data frame.

Figure 5:
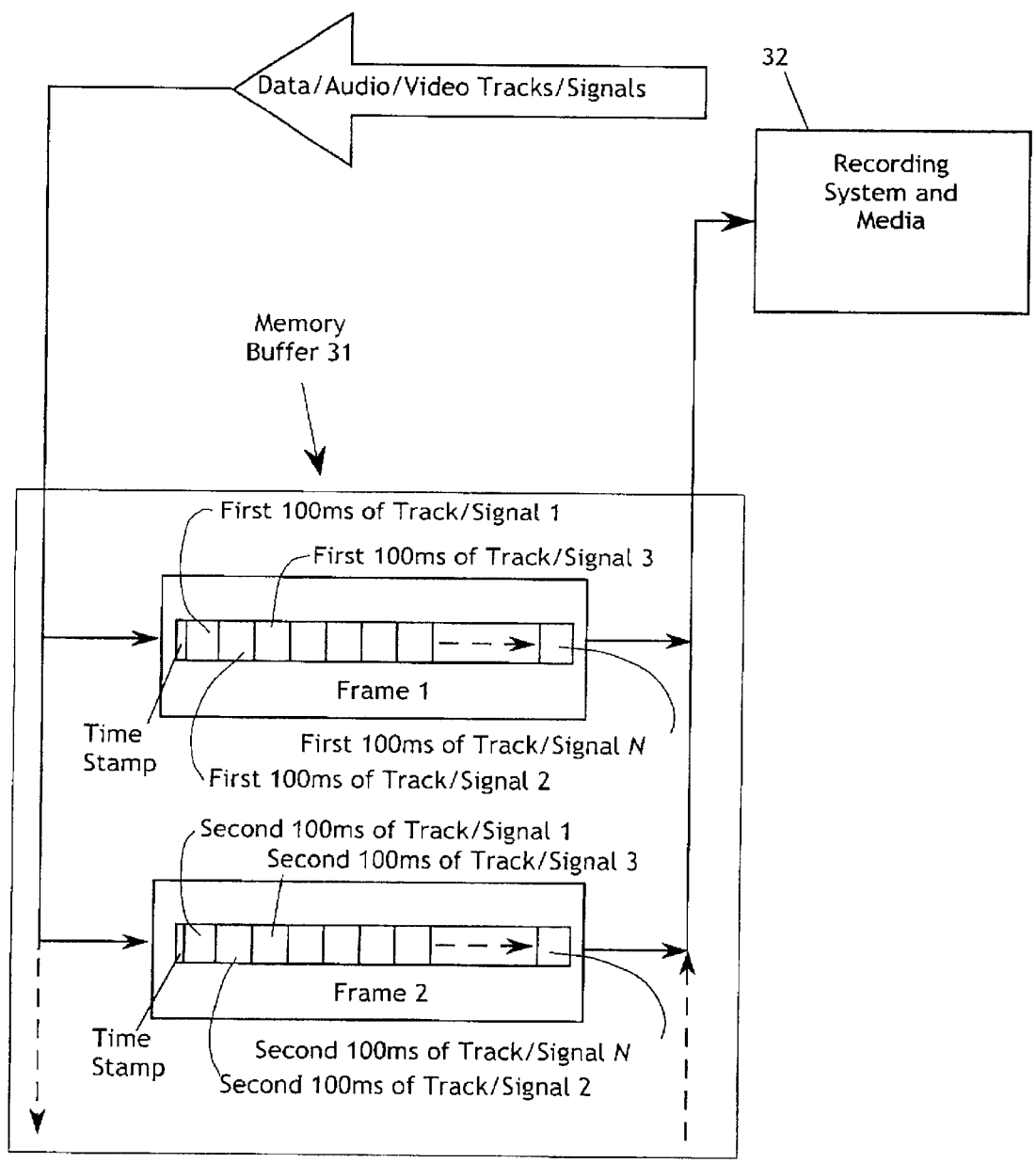
FIG. 5 is a schematic representation of another embodiment of the invention in which audio or data tracks or signals from any source, whether pre-recorded or not, are reorganized into composite data frames and recorded for future playback.

The invention may be generalized as depicted in FIG. 5. A plurality of audio, video and/or data tracks/signals is acquired from any source, such as a recording system, data storage system, network resource, real-time sources, a computer bus or other data bus, internet data stream, live recording or the like. As stated previously, any reference to audio tracks, data tracks or video tracks is presumed to include any and all audio signals, data signals, or video signals, or any combination thereof, whether or not they are specifically configured as tracks, and any reference to one is intended to encompass all.

The audio and/or data tracks are fed into a memory buffer 31, where the tracks are rearranged into composite data frames as described in the previous embodiments. That is, temporal segments of each of the tracks are captured and assembled in a predetermined or calculated order. For example, the first 100 ms of each track/signal is read into the buffer in a predetermined order to form composite data frame 1, and a time stamp (time code) is added to indicate the starting point of the frame as well as the number of the frame. Likewise, the second 100 ms segments of each track are assembled as composite data frame 2, which is also labeled with its respective time stamp. This process is reiterated to generate a plurality of composite data frames. As before, reiteration after frame 1 may be carried out R times, where R may vary from zero to any positive integer.

The composite data frames are recorded by a recording system and media 32, which may be any form of magnetic disk media, optical media, tape media, RAM, ROM, WORM media or the like. The recording system may use permanent or erasable media. As described previously, a registry of the time stamps of all the composite data frames can be created and stored in the recording system and media 32. The composite date frames may be recorded in any predetermined order, or in a changeable order.

To effect playback of the audio and/or data tracks/signals, each composite frame is read from the recording system in the order set by the time stamp registry and loaded into the memory buffer. Each composite data frame is disassembled in the buffer, and each temporal segment of each track is routed to a respective output destination. This process is reiterated, so that each output destination receives the temporal segments of a single audio and/or data track in the order they were recorded. The playback data rate is sufficient so that the playback of all the audio and/or data tracks appears to be continuous and simultaneous.

The embodiment of FIG. 5 may also incorporate the sub-section recording and playback techniques described above with reference to FIG. 3.

An important characteristic of the embodiment of FIG. 5 is that from the instant that playback is initiated, all of the tracks/signals stream from the recording device and are available to be played, processed, modified, and/or re-recorded. Furthermore, playback speed is not noticeably delayed by the seek time of the recording medium, nor limited by the bit structure or sample rate of any audio or data signal.

It should be noted that when the data/audio/video signals are contained within any memory, the signals may be read out from the memory into composite data frames, as shown, without requiring a separate memory buffer 31. Temporal segments may be drawn directly from the memory under software control to construct composite data frames, as described herein, and the data frames thus formed may be transmitted to a recording system 32 for capture in any media noted previously.

Figure 6A:
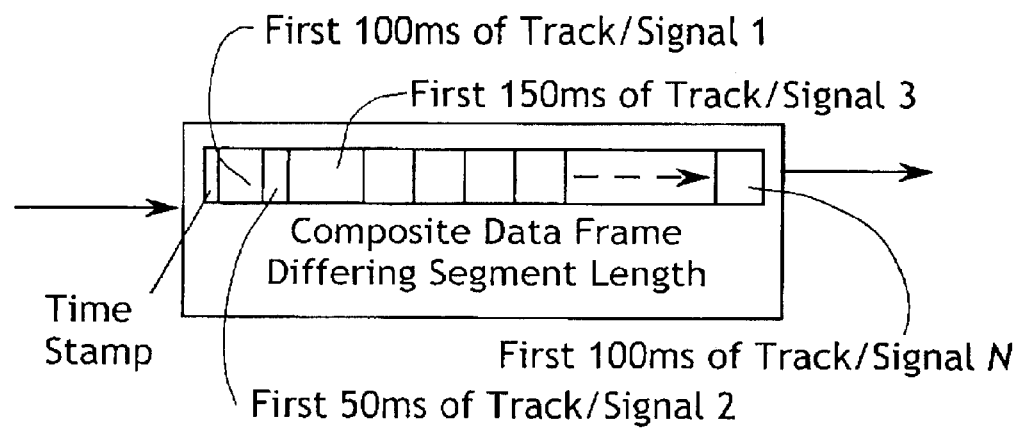
FIGS. 6A–6C are schematic representations of further embodiments of composite data frames constructed in accordance with the present invention.

With regard to FIG. 6A, the invention also encompasses constructing composite data frames with variable segment lengths; i.e., temporal segments of a plurality of audio, video, and/or data signals, in which the temporal segments differ in length of time that each signal track is sampled. Thus, for example, the first temporal segment of the composite data frame may comprise 100 ms of track 1, the second segment may comprise 50 ms of track 2, and the third segment may be 100 ms, and subsequent temporal segment length may vary in similar or dissimilar fashion. Subsequent composite data frames may have selectively varied temporal segment lengths, so that the average data rate for each track during playback is sufficient to permit simultaneous streaming outputs of all tracks. Alternatively, the subsequent data frames may maintain the differing temporal segment length shown in FIG. 6A, if, for example, the shorter segments of the data frame are transmitting signals that have been compressed and can be expanded to enable simultaneous streaming outputs with the other uncompressed tracks having longer frame segments.

Figure 6B:
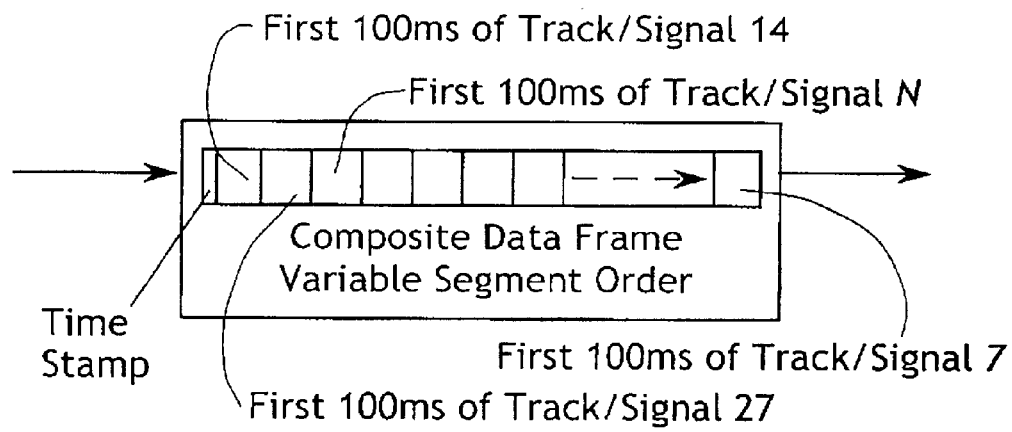

Likewise, with regard to FIG. 6B, composite data frames may be constructed in which the temporal segments of the data frame are arrayed in non-serial order that may be fixed or re-arranged in each data frame. The re-ordering of the temporal segment order in subsequent composite data frames may be carried out in accordance with a predetermined function, whereby the composite data frames may be read out and played back only by devices that are equipped to carry out the predetermined function. This capability may comprise a data encryption technique that enables protected recording and playback of audio, video, and data signals and may be used to dissuade unauthorized copying of protected recordings.

Figure 6C:
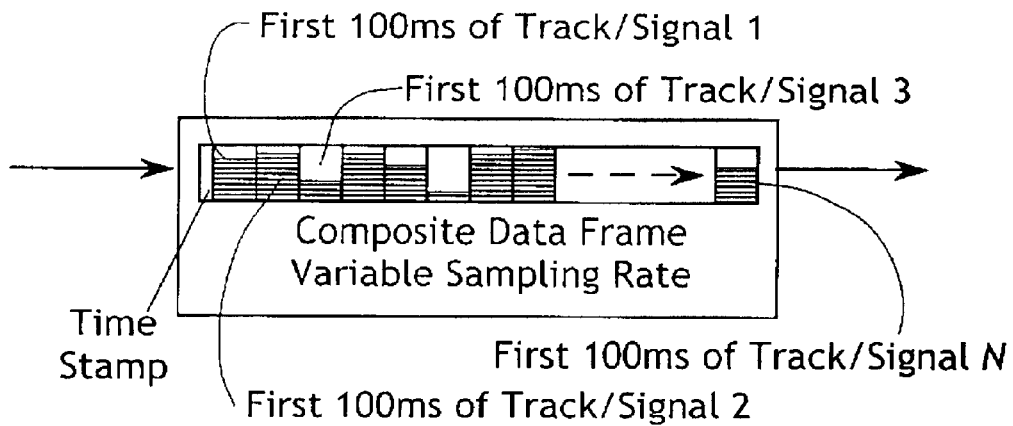

As shown in FIG. 6C, the temporal segments of the respective signal track may contain data sampled at differing rates, based on the data rate of the signal track from which the segment was drawn. The data rate of each temporal segment is represented by the amount of hatching of the respective segment. For example, the composite data frame may contain temporal segments from audio tracks (at various data rates), video tracks (at higher data rates) and data tracks (at various data rates).

The techniques for forming composite data frames illustrated in FIGS. 6A–6C may be used singly or in combination. For example, differing lengths of temporal segments may be placed in variable serial order that varies with each subsequent composite data frame. Or, temporal segments containing signals of varying sample rates may be placed in variable serial order that varies with each subsequent composite data frame. Other combinatorial strategies may be apparent to those skilled in the art. Likewise, variable bit structure among the signals being recorded and played back may be accommodated.

Also, it is noted that the recording and playback techniques disclosed herein work equally well on compressed or non-compressed data, in any of the formats illustrated in FIGS. 6A–6C.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiments described are selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A process for playing a large plurality of recorded audio signals simultaneously, including the steps of:

reading first incremental temporal segments of each of a plurality of audio signals from a data disk drive;

assembling said first incremental temporal segments in a predetermined order in a first composite data frame;

reiterating said steps of reading and assembling to read second and subsequent incremental temporal segments of each of the plurality of audio signals and assembling said second and subsequent incremental temporal segments in said predetermined order to form respective second and subsequent composite data frames in an ordered manner;

recording said composite data frames onto a data disk drive;

reading out said composite data frames from the data disk drive; and, converting said composite data frames to reconstitute the original plurality of audio signals.

2. The process for simultaneous playback of claim 1, wherein said assembling step includes reading said incremental temporal segments into a memory buffer.

3. The process for simultaneous playback of claim 1, further including the step of attaching a time stamp to each of said composite data frames, said time stamp identifying said time order of each composite data frame.

4. The process for simultaneous playback of claim 3, further including the step of creating a registry of the time stamps of all composite data frames recorded on the data disk.

5. The process for simultaneous playback of claim 4, further including the step of recording said registry on the data disk on which the composite data frames are recorded.

6. The process for simultaneous playback of claim 4, further including the step of recording said registry in a memory other than the data disk on which the composite data frames are recorded.

7. The process for simultaneous playback of claim 1, wherein said recording step includes recording said composite data frames in substantially contiguous relationship on said data disk.

8. The process for simultaneous playback of claim 1, wherein said converting step includes loading each of said composite data frames into a memory buffer, and disassembling each composite data frame into said incremental temporal segments, and defining each of said incremental temporal segments as an individual audio signal in correspondence with the predetermined order of each incremental temporal segment in the composite data frame.

9. The process for simultaneous playback of claim 8, wherein said disassembling step is carried out on one composite data frame in the memory buffer while the subsequent composite data frame in said predetermined order is loaded into the memory buffer.

10. The process for simultaneous playback of claim 1, wherein said predetermined order is constant among all the composite data frames.

11. The process for simultaneous playback of claim 1, wherein said predetermined order is a variable among all the composite data frames.

12. The process for simultaneous playback of claim 1, further including the step of subdividing each of said composite data frames into a plurality of sub-sections, and said step of recording said composite data frames includes recording the plurality of sub-sections on the data disk in a generally contiguous manner.

13. The process for simultaneous playback of claim 12, wherein the step of subdividing includes taking an incremental time slice of each incremental temporal segment of each audio signal and assembling the time slices to form a sub-section of the respective composite data frame.

14. Apparatus for playing a large plurality of recorded audio signals simultaneously, including:
   means for placing the plurality of audio signals on a data disk;
   means for reorganizing the plurality of audio signals into a plurality of composite data frames, each composite data frame comprising incremental temporal segments of all of the plurality of audio signals arranged in a predetermined order, said incremental temporal segments of each composite data frame comprising samples of all the audio signals taken at synchronized time increments;
   means for recording said plurality of composite data frames in substantially contiguous relationship on a data disk drive;
   means for reading out said plurality of composite data frames from said data disk drive in the order in which they were recorded;
   means for disassembling each composite data frame into said incremental temporal segments, and means for defining each incremental temporal segment as an audio signal, each respective audio signal comprising a reconstituted one of said plurality of audio signals.

15. The apparatus of claim 14, further including means for subdividing each of said composite data frames into a plurality of sub-sections, each sub-section including a plurality of time slices of each incremental temporal segment assembled in an ordered manner, said means for recording including means for recording said plurality of sub-sections of each composite data frame in substantially contiguous manner on the data disk.

16. A process for playing a large plurality of recorded data signals simultaneously, including the steps of:
   reading first incremental temporal segments of each of a plurality of data signals from a data disk drive;
   assembling said first incremental temporal segments in a predetermined order in a first composite data frame;
   reiterating said steps of reading and assembling to read second and subsequent incremental temporal segments of each of the plurality of data signals and assembling said second and subsequent incremental temporal segments in said predetermined order to form respective second and subsequent composite data frames in an ordered manner;
   recording said composite data frames onto a data disk drive;
   reading out said composite data frames from the data disk drive; and,
   converting said composite data frames to reconstitute the original plurality of data signals.

17. The process for simultaneous playback of claim 16, wherein said converting step includes loading each of said composite data frames into a memory buffer, and disassembling each composite data frame into said incremental temporal segments, and defining each of said incremental temporal segments as an individual data signal in correspondence with the predetermined order of each incremental temporal segment in the composite data frame.

18. A process for recording and playing a plurality of data signals simultaneously, including the steps of:
   acquiring a plurality of data signals;
   assembling first incremental temporal segments of said plurality of data signals in a first composite data frames;
   reiterating said steps of reading and assembling to read second and subsequent incremental temporal segments of each of the plurality of data signals and assembling said second and subsequent incremental temporal segments to form respective second and subsequent composite data frames;
   recording said composite data frames on a recording medium;
   reading out said composite data frames from the recording medium; and,
   converting said composite data frames to reconstitute the original plurality of data signals.

19. The process for recording and playing a plurality of data signals of claim 18, wherein said defining and assembling steps includes reading said incremental temporal segments into a memory.

20. The process for recording and playing a plurality of data signals of claim 18, further including the step of attaching a time stamp to each of said composite data frames, said time stamp identifying a time order of each composite data frame.

21. The process for recording and playing a plurality of data signals of claim 20, further including the step of creating a registry of the time stamps of all composite data frames recorded on the recording medium.

22. The process for recording and playing a plurality of data signals of claim 21, further including the step of recording said registry in a memory other than the recording medium in which the composite data frames are recorded.

23. The process for recording and playing a plurality of data signals of claim 18, wherein said converting step includes loading each of said composite data frames into a memory buffer, and disassembling each composite data frame into said incremental temporal segments, and defining each of said incremental temporal segments as an individual data signal in correspondence with the order of each incremental temporal segment in the composite data frame.

24. The process for recording and playing a plurality of data signals of claim 23, wherein said disassembling step is carried out on one composite data frame in the memory buffer while the subsequent composite data frame is loaded into the memory buffer.

25. The process for recording and playing a plurality of data signals of claim 18, wherein a predetermined order is constant among all the composite data frames.

26. The process for recording and playing a plurality of data signals of claim 18, wherein a predetermined order is a variable among all the composite data frames.

27. The process for recording and playing a plurality of data signals of claim 18, wherein said first incremental temporal segments have a constant temporal length among all the composite data frames.

28. The process for recording and playing a plurality of data signals of claim 18, further including the step of subdividing each of said composite data frames into a plurality of sub-sections, and said step of recording said composite data frames includes recording the plurality of sub-sections on said recording medium.

29. The process for recording and playing a plurality of data signals of claim 28, wherein the step of subdividing includes taking an incremental time slice of each incremental temporal segment of each data signal and assembling the time slices to form a sub-section of the respective composite data frame.

30. Apparatus for recording and playing a plurality of data signals simultaneously, including:
   means for acquiring the plurality of data signals;
   means for reorganizing the plurality of data signals into a plurality of composite data frames, each composite data frame comprising incremental temporal segments of all of the plurality of data, said incremental temporal segments of each composite data frame comprising samples of all the data signals taken at synchronized time increments;
   means for recording said plurality of composite data frames on a recording meduim;
   means for reading out said plurality of composite data frames from said recording medium in the order in which they were recorded;
   means for disassembling each composite data frame into said incremental temporal segments, and means for defining each incremental temporal segment as a data signal, each respective data signal comprising a reconstituted one of said plurality of data signals.

31. The apparatus of claim 30, further including means for subdividing each of said composite data frames into a plurality of sub-sections, each sub-section including a plurality of time slices of each incremental temporal segment assembled in an ordered manner, said means for recording including means for recording said plurality of sub-sections of each composite data frame in said recording medium.

32. The process for simultaneous playback of claim 30, wherein said first incremental temporal segments have differing temporal length.

33. The process for simultaneous playback of claim 30, wherein the serial order of said assembled temporal segments is altered in said second and subsequent composite data frames.

34. The process for simultaneous playback of claim 30, wherein said temporal segments of each of said data signals contain data sampled at different data rates.

35. The process for simultaneous playback of claim 30, wherein said temporal segments of each of said data signals contain data having different bit structures.

36. The process for simultaneous playback of claim 30, wherein said data signals include audio signals and video signals.

37. The process for simultaneous playback of claim 30, wherein the serial order of said assembled temporal segments in the first of said composite data frame is altered in second and subsequent composite data frames in accordance with a predetermined algorithm.

38. A process for playing a large plurality of recorded data signals simultaneously, including the steps of:
   acquiring first incremental temporal segments of each of a plurality of data signals;
   assembling said first incremental temporal segments in a first composite data frame;
   reiterating said steps of reading and assembling to read second and subsequent incremental temporal segments of each of the plurality of data signals and assembling said second and subsequent incremental temporal segments to form respective second and subsequent composite data;
   recording said composite data frames on a recording medium;
   reading out said composite data frames from the recording medium; and,
   converting said composite data frames to reconstitute the original plurality of data signals.

39. The process for simultaneous playback of claim 38, wherein said converting step includes loading each of said composite data frames into memory, and disassembling each composite data frame into said incremental temporal segments, and defining each of said incremental temporal segments as an individual data signal in correspondence with the order of each incremental temporal segment in the composite data frame.

40. The process for simultaneous playback of claim 38, wherein said first incremental temporal segments have differing temporal length.

41. The process for simultaneous playback of claim 38, wherein said order of said assembled temporal segments is altered in said second and subsequent composite data frames.

42. The process for simultaneous playback of claim 38, wherein said temporal segments of each of said data signals contain data sampled at different data rates.

43. The process for simultaneous playback of claim 38, wherein said temporal segments of each of said data signals contain data having different bit structures.

44. The process for simultaneous playback of claim 38, wherein said data signals include audio signals and video signals.

45. The process for simultaneous playback of claim 38, wherein said data signals include compressed signals.

46. The process for simultaneous playback of claim 38, wherein said order of said assembled temporal segments is altered in said second and subsequent composite data frames in accordance with a predetermined algorithm.

47. A process for playing a large plurality of recorded signals simultaneously, including the steps of:

reading first incremental temporal segments of each of a plurality of signals from a data source;

assembling said first incremental temporal segments in a first composite data frame;

reiterating said steps of reading and assembling to read second and subsequent incremental temporal segments of each of the plurality of audio signals and assembling said second and subsequent incremental temporal segments to form respective second and subsequent composite data frames in an ordered manner;

recording said composite data frames in a recording medium;

reading out said composite data frames from the recording medium; and, converting said composite data frames to reconstitute the original plurality of audio signals.

48. The process for simultaneous playback of claim 47, wherein said assembling step includes reading said incremental temporal segments into a memory buffer.

49. The process for simultaneous playback of claim 47, further including the step of attaching a time stamp to each of said composite data frames, said time stamp identifying said time order of each composite data frame.

50. The process for simultaneous playback of claim 49, further including the step of creating a registry of the time stamps of all composite data frames recorded on the recording medium.

51. The process for simultaneous playback of claim 49, further including the step of recording said registry on the medium on which the composite data frames are recorded.

52. The process for simultaneous playback of claim 49, further including the step of recording said registry in a memory other than the medium on which the composite data frames are recorded.

53. The process for simultaneous playback of claim 47, wherein said recording step includes recording said composite data frames in substantially contiguous relationship on recording medium.

54. The process for simultaneous playback of claim 47, wherein said converting step includes loading each of said composite data frames into a memory buffer, and disassembling each composite data frame into said incremental temporal segments, and defining each of said incremental temporal segments as an individual audio signal in correspondence with the order of each incremental temporal segment in the composite data frame.

55. The process for simultaneous playback of claim 54, wherein said disassembling step is carried out on one composite data frame in the memory buffer while the subsequent composite data frame in said predetermined order is loaded into the memory buffer.

56. The process for simultaneous playback of claim 47, wherein said ordered manner is constant among all the composite data frames.

57. The process for simultaneous playback of claim 47, wherein said ordered manner is a variable among all the composite data frames.

58. The process for simultaneous playback of claim 47, further including the step of subdividing each of said composite data frames into a plurality of sub-sections, and said step of recording said composite data frames includes recording the plurality of sub-sections on the recording medium in a generally contiguous manner.

59. The process for simultaneous playback of claim 58, wherein the step of subdividing includes taking an incremental time slice of each incremental temporal segment of each audio signal and assembling the time slices to form a sub-section of the respective composite data frame.

60. The process for simultaneous playback of claim 47, wherein said recording step includes recording said composite data frames in a recording medium as a single file that may be read out as a continuous data stream.

\* \* \* \* \*